(12) United States Patent
Cornwall et al.

(10) Patent No.: US 8,248,268 B2
(45) Date of Patent: Aug. 21, 2012

(54) REQUESTED TIME ADJUSTMENT FOR ACCURATE DATA EXCHANGE

(75) Inventors: Mark Cornwall, Spokane, WA (US); Barry Cahill-O'Brien, Spokane, WA (US); Jack Tweedy, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 732 days.

(21) Appl. No.: 12/362,374

(22) Filed: Jan. 29, 2009

(65) Prior Publication Data

US 2010/0188256 A1 Jul. 29, 2010

(51) Int. Cl.
*G08B 23/00* (2006.01)
*G08C 15/06* (2006.01)

(52) U.S. Cl. ................................. 340/870.02
(58) Field of Classification Search .......... 370/870.02–870.05, 870.07
See application file for complete search history.

(56) References Cited

U.S. PATENT DOCUMENTS

| | | | |
|---|---|---|---|
| 6,069,571 A | 5/2000 | Tell | |
| 6,195,018 B1 | 2/2001 | Ragle et al. | |
| 6,295,541 B1 * | 9/2001 | Bodnar et al. | 1/1 |
| 6,636,744 B1 | 10/2003 | Da | |
| 6,639,957 B2 * | 10/2003 | Cahill-O'Brien et al. | 375/354 |
| 6,798,352 B2 * | 9/2004 | Holowick | 340/870.02 |
| 7,741,976 B2 | 6/2010 | Crider et al. | |
| 2001/0022823 A1 * | 9/2001 | Renaud | 375/359 |
| 2006/0071812 A1 * | 4/2006 | Mason et al. | 340/870.02 |
| 2008/0064934 A1 * | 3/2008 | Frei et al. | 600/300 |
| 2008/0075218 A1 * | 3/2008 | Monier et al. | 375/371 |
| 2008/0224889 A1 * | 9/2008 | Wyk et al. | 340/870.01 |
| 2009/0102681 A1 * | 4/2009 | Brennan et al. | 340/870.03 |

\* cited by examiner

*Primary Examiner* — Rexford Barnie
*Assistant Examiner* — Christopher Clark
(74) *Attorney, Agent, or Firm* — Dority & Manning, P.A.

(57) ABSTRACT

A system, method and device are provided for reducing consumption calculation errors caused due to time drift in an endpoint device. In one embodiment, the endpoint device transmits consumption data in response to a request for consumption data. The request generally includes a time period of the consumption data. The endpoint device adjusts the set of intervals based on the extent of the difference between the collection system time and the endpoint device time to obtain the most accurate intervals. The process for adjusting intervals can be implemented independently from time synchronization between the endpoint and collection systems. Further, the process for adjusting intervals does not result in updating the meter reading data that have been already logged and stored in the endpoint device.

14 Claims, 4 Drawing Sheets

REQUESTED TIME ADJUSTMENT FOR ACCURATE DATA EXCHANGE

BACKGROUND

Through advancements in metering infrastructure, the collection of meter readings that quantify the consumption of utility services (i.e., natural gas, water, electricity, etc.) is being automated. In an automated meter reader system, "endpoint devices" coupled to utility meters are typically used to collect and record the meter readings for transmission to reader devices. The endpoint devices that are configured to communicate consumption data in this way are commercially available and increasingly being installed in homes, businesses, and the like.

In some automated meter reader systems, the endpoint devices are configured to record meter readings at predetermined intervals and to transmit the meter readings to a reader device. In some cases, the endpoint devices include a microprocessor-implemented real time clock that is used when recording meter reading data or transmitting meter reading data. In such cases, synchronization among various endpoint devices and reader devices is necessary within the automated meter reader system. However, such synchronization has been a challenge due to the time differences among time zones, daylight savings time adjustment, leap year adjustment, etc.

In other implementations, each endpoint device includes a simple timing device, which eliminates the need of real time synchronization among the endpoint devices. In these implementations, the reader device, which collects meter reading data from the endpoint devices, typically adds a timestamp to the collected meter reading data.

In an ideal environment, the time-stamped data are processed later in a processing system and thus the reader device does not need to perform much computation other than adding timestamps. However, if the endpoint device time has drifted, the reader device cannot simply timestamp the collected data. In most cases, the reader device and the endpoint device exchange several messages to determine the time drift and to generate accurate timestamps for the collected data. For some types of meter reading systems, in particular, for a meter reading system that includes a small number of reader devices that collect meter readings from a large number of endpoint devices, this can possibly lead to overburdening the reader devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system, method and device are provided for reducing meter reading errors due to time drift in an endpoint device in order to determine accurate consumption data. The endpoint device transmits consumption data in response to receipt of a request for consumption data and a time period (a requested time) of the consumption data. In the endpoint device, meter reading data are recorded in a fixed number of intervals and stored. Thus, the requested time may be represented by a set of intervals with information about a starting interval or the like.

In one embodiment, the difference between the collection system time and the endpoint device time is considered to determine the most accurate intervals for the request. In this embodiment, the endpoint device adjusts the set of intervals based on the extent of the difference between the collection system time and the endpoint device time to obtain the most accurate intervals. In one aspect, the process for adjusting intervals can be implemented independently from time synchronization between the endpoint and collection systems. Further, the process for adjusting intervals does not result in updating the meter reading data that have been already logged and stored in the endpoint device.

In accordance with an aspect of an embodiment, a method is provided for adjusting a set of time intervals to provide a remote device with accurate meter reading data. The method comprises receiving a current remote device time and a request for meter reading data for a specified number of time intervals and determining whether a difference between the remote device time and the endpoint device time is at least as great as a threshold. If the difference is at least as great as the threshold, the number of time intervals used to calculate meter reading is adjusted and the meter reading data over the adjusted number of time intervals are calculated. Then, the calculated meter reading data over the adjusted number of time intervals is transmitted to the remote device.

In accordance with another aspect of an embodiment, a computer-readable medium having computer-executable components for collecting meter reading data from an endpoint device is provided. The computer-executable components comprise a calculation component, a synchronization component and an adjustment component. The calculation component is configured to calculate the consumption of a utility service over a specified number of time intervals. The synchronization component is configured to synchronize a time of the endpoint device with a time reported by the collection system at regular intervals, wherein the synchronization of the endpoint device is performed independently from the collection of meter reading data. The adjustment component is operative to receive a request for meter reading data and adjust the number of time intervals used to calculate the meter reading data if the difference between the time as reported by the collection system and the time of the endpoint device is at least as great as a threshold. The adjustment component is further operative to cause the calculation component to calculate the meter reading data over the adjusted number of time intervals.

In accordance with yet another aspect of an embodiment, an apparatus for transferring accurate meter reading data to a collection system is provided. The apparatus comprises a memory unit, a communication unit and a processor unit. The memory unit stores meter reading data collected at predetermined time intervals. The communication unit receives, from the collection system, a collection system time and a request for meter reading data for a specified number of time intervals. The processor unit is operable to determine whether a difference between the collection system time and the endpoint device time is at least as great as a threshold. If the difference is at least as great as the threshold, the number of time intervals used to calculate meter reading is adjusted. The number of time intervals used to calculate the meter reading data is adjusted to include one less time interval than is reflected in the request if the time of the endpoint device is greater than the time as reported by the collection system. The number of time intervals used to calculate the meter reading data is adjusted to include one more time interval than is reflected in the request if the time as reported by the collection system is greater than the time of the endpoint device. The processor unit is operable to calculate the meter reading data over the adjusted number of time intervals and to cause the communication unit to transmit the calculated meter reading data to the collection system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings is intended as a description of various embodiments of the disclosed subject matter and is not intended to represent the only embodiments. Generally stated, meter reading errors caused by time drift in an endpoint device are substantially eliminated by adjusting a requested time sent from a collection system. In one embodiment, an endpoint device transmits consumption data upon receipt of a request for the consumption data from a collection system. The request generally includes a time period (a requested time) of the consumption data. In one embodiment, the meter reading data may be recorded in a fixed number of intervals and stored in a corresponding endpoint device. In this embodiment, a requested time may be represented by a set of intervals which indicates a requested time period when consumption data have been collected.

As will be discussed in more detail below, the difference between the collection system time and the endpoint device time is considered to determine the most accurate intervals for responding the request. In this regard, the endpoint device adjusts the set of intervals based on the extent of the difference between the collection system time and the endpoint device time to obtain the most accurate intervals. In one aspect, the process for adjusting intervals can be implemented independently from time synchronization between the endpoint and collection systems. Further, the process for adjusting intervals does not result in updating the meter reading data that have been already logged and stored in the endpoint device.

Each embodiment described in this disclosure is provided merely as an example or illustration and should not be construed as preferred or advantageous over other embodiments. In this regard, the following description first provides an overview of a metering environment in which the disclosed subject matter may be implemented. Then, several examples of routines used for recording meter reading data at intervals and providing meter reading data with adjusted time are described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Figure 1:
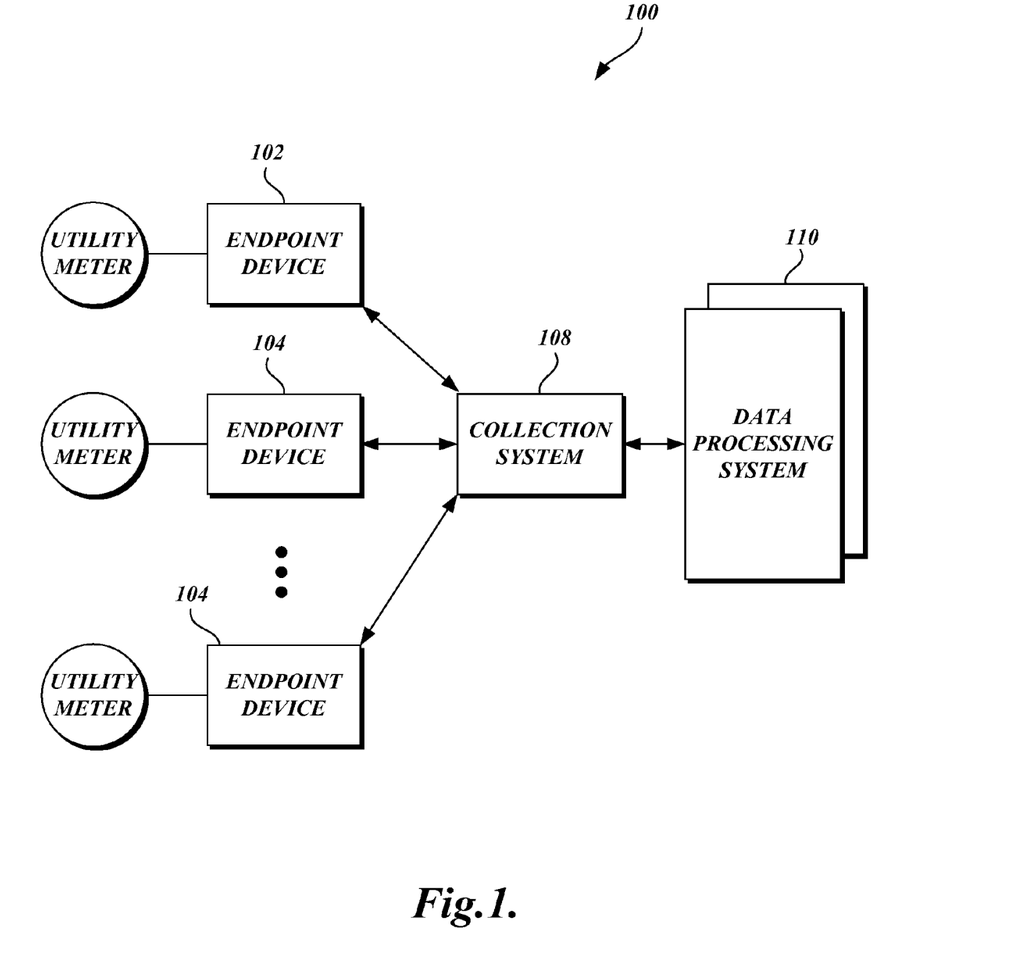
FIG. 1 is a block diagram depicting an illustrative metering environment suitable for adjusting a requested time/interval(s) in accordance with an embodiment of the disclosed subject matter.

Referring now to FIG. 1, the following is intended to provide a general overview of one embodiment of a meter reading system 100 in which aspects of the disclosed subject matter may be implemented. Generally described, the meter reading system 100 depicted in FIG. 1 includes a plurality of endpoint devices 102-106 associated with, for example, utility meters (e.g., gas meters, water meters, electric meters, etc.), for obtaining data, such as meter data (e.g., consumption data, tampering data, etc.) therefrom. Each endpoint device 102 in the meter reading system 100 may be a wired or wireless communications device capable of performing two way communications with the collection system 108 utilizing automated meter reading protocols. For example, the endpoint devices 102 are capable of receiving data (e.g., messages, commands, etc.) from the collection system 108 and transmitting meter reading data and/or other data to the collection system 108. Depending on the exact configuration and types of devices used, the endpoint devices 102-106 transmit data either periodically ("bubble-up"), in response to a wake-up signal, in response to a request from the collection system, in a combination/hybrid configuration. In each instance, the endpoint devices 102-106 are configured to exchange data with the collection system 108.

In some embodiments, the collection system 108 may employ some type of a protocol to communicate with the endpoint devices 102-106. The collection system 108 is suitable to transmit a request to the endpoint devices for obtaining meter reading data and to receive messages including meter reading data from the endpoint devices. In this regard, the collection system 108 may be a fixed network comprised of Cell Control Units ("CCU") that collect radio-based meter readings within a particular geographic area. The meter readings received from the endpoint devices 102-106 may be processed and forwarded by a CCU to a data processing system 110. In some embodiments, the collection system 108 may include a drive-by reading system or a mobile reading system (e.g., a system employing field vehicles and portable reader devices) that collects meter readings while a field vehicle is driving through a particular geographic area. Those skilled in the art and others will recognize that the collection of meter readings may be performed utilizing other meter reading systems (e.g., mesh/micro networks, handheld devices, Telephone-Base, etc.) and the examples provided herein should be construed as exemplary.

In one aspect, the collection system 108 is configured to leverage the two-way communication capabilities of the endpoint devices 102-106 when meter readings are collected from the endpoint devices. As will be discussed in further detail below, the endpoint devices 102-106 may be configured to record meter readings at particular intervals, calculate the current consumption data based on a correct set of intervals, and transmit the calculated consumption data in response to a request from the collection system. In one aspect, the endpoint devices record meter readings in such a way that any calculations on the fly performed by the collection system can be minimized and the communication between the collection system and the endpoint device can be reduced while an accuracy of less than an hour for consumption data can be maintained.

The discussion provided above with reference to FIG. 1 is intended as a brief, general description of one meter reading system 100 capable of implementing various features of the disclosed subject matter. While the description above is made with reference to particular devices linked together through different interfaces, those skilled in the art will appreciate that the claimed subject matter may be implemented in other contexts.

Figure 2:
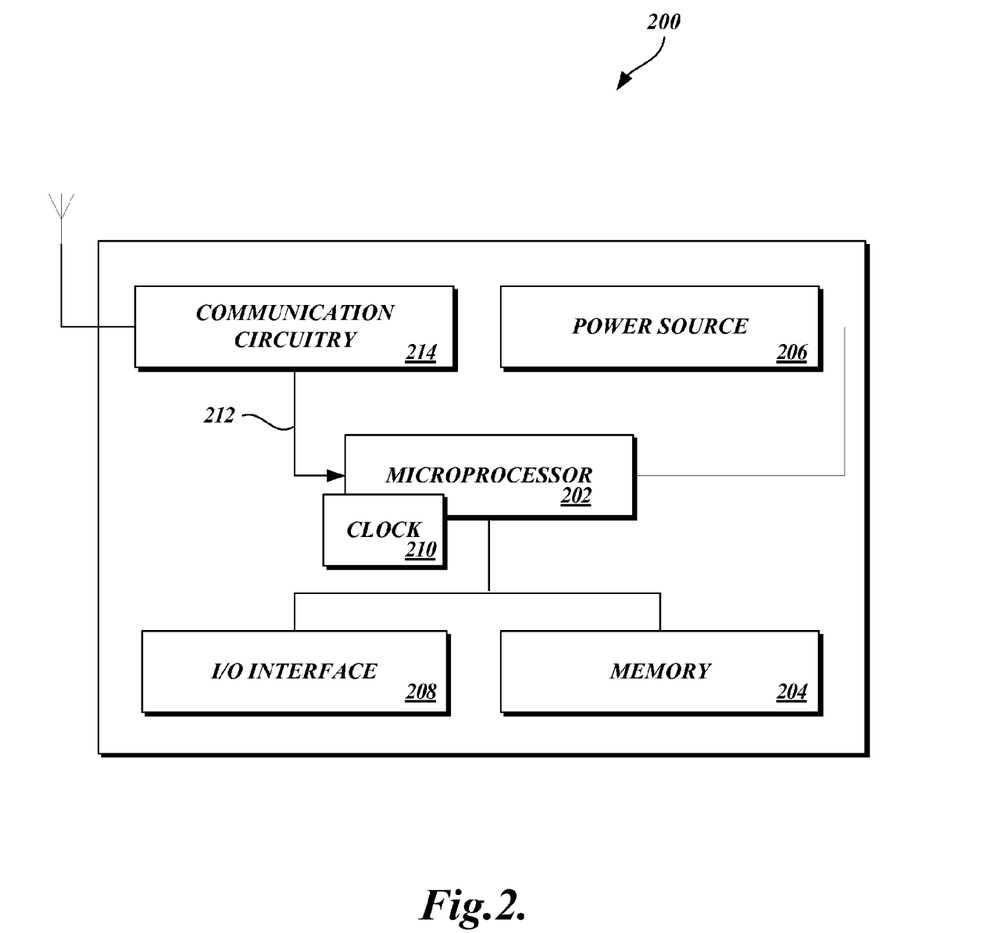
FIG. 2 is a block diagram illustrating components of one example of an endpoint device in accordance with an embodiment of the disclosed subject matter.

Now with reference to FIG. 2, an example component architecture for the endpoint device 200 will be described. Generally described, the endpoint device 200 includes a processor 202, a timing device or clock 210, and a memory 204, connected by a communication bus 212. As further depicted in FIG. 2, the endpoint device 200 includes an interface component 208 operable for communication with a corresponding utility meter (not shown) and a power source component 206, such as a battery or the like. The endpoint device 200 may further include communication circuitry 214 for transmitting/receiving wireless communications with other radio-based devices (e.g., collection systems, etc.) or a network.

In one aspect, the processor 202 is a microprocessor operable to perform timing and recording operations in connection with the timing device or clock 210 (e.g., a microcontroller-implemented timing clock, a radio timing clock, etc.). In one embodiment, the clock 210 is a slow crystal oscillator incremented by 2 seconds, which is configured to count every 60 minutes (an hour) and triggers recording of meter reading data at hourly intervals (or, alternatively, particular intervals set by the meter reading system). As such, the clock 210 tracks minutes but may not track hours and thus contains the minute portion of a current date/time. For example, if the current time is 6:25 PM, Jun. 1, 2008, the clock reads 25 minutes which is the minute portion of the current time.

In some embodiments, the endpoint device contains in memory 204 a log of "recorded intervals" (meter reading data collected for the last 40 days at hourly intervals), a "partial hour interval" (meter reading data collected at an interval that is less than an hour), the "total consumption," and the like. As used herein, the term, "interval" or "recorded interval," refers to meter reading data collected during a particular hour, which is associated with an interval number that generally indicates a number of hours passed from the current time. As discussed above, the clock of the endpoint device counts every 60 minutes and triggers recording of a "recorded interval" for that hour. The recording process will be discussed in further detail below in connection with FIG. 3.

In some embodiments, the endpoint device keeps a log of 960 recorded intervals (i.e., a log of the last 40 days of hourly intervals) in the memory 204. As will be understood by one skilled in the art, the number of maximum recorded intervals, the number of days, or the like is rather a design choice. Thus, the aforementioned embodiments should not be considered as limiting the scope of the claimed subject matter. As will be well understood, keeping many days of intervals in the endpoint device is very useful. For example, the log of the days of intervals may be used to calculate the correct consumption for any time period. If there is an interruption (power failure) in communication or in the system (missing data because of the interruption), the data can be recovered from the log of recorded intervals as long as the collection system knows what time and how long. Since the logging/recording process will be discussed in further detail in connection with FIG. 3, the logging/recording process will only be briefly discussed here.

By way of example, an exemplary table showing recorded intervals (including the last interval for "12:00 pm-1:00 pm, Apr. 22, 2008"), a partial hour interval, and total consumption stored in the endpoint device at one point of time is as follows:

TABLE 1

| Consumption | 123450 | 12:05 pm Jun. 1st, 2008 |
|---|---|---|
| Partial hour | 3 | 12:00 pm-12:05 pm Jun. 1st, 2008 |

| Interval # | Value | |
|---|---|---|
| 1 | 12 | 11:00 am-12:00 pm Jun. 1st, 2008 |
| 2 | 3 | 10:00 am-11:00 am Jun. 1st, 2008 |
| 3 | 2 | 9:00 am-10:00 am Jun. 1st, 2008 |
| 4 | 5 | 8:00 am-9:00 am Jun. 1st, 2008 |
| . | . | |
| . | . | |
| . | . | |
| 960 | 2 | 12:00 pm-1:00 pm Apr. 22nd, 2008 |

Generally described, to obtain the consumption data that have been collected during a certain time period, the collection system may send a request message that asks the endpoint device to go back a certain number of hours. In one aspect, the collection system can readily determine the last interval hour based on the current time kept by the endpoint device (since the endpoint device keeps 960 intervals at any time) and request consumption data accordingly. In this regard, the collection system can request consumption of any time from the last interval. As shown above, the last (e.g., $960^{th}$ hour) interval is "12:00 pm-1:00 pm, Apr. 22, 2008" which can be determined from the current time, 12:05 pm Jun. 1, 2008. The first recorded interval for "11:00 am-12:00 pm Jun. 1, 2008" is the most recent record in the log. In one aspect, the endpoint device is configured to record the intervals without any interruption or gaps in the intervals.

For ease of discussion, consider a scenario where, at 12:05 PM Jun. 1, 2008, the collection system requests from the endpoint device the consumption data of 9:00 AM Jun. 1, 2008 (i.e., consumption data that have been collected from the last interval to 9:00 AM Jun. 1, 2008). In this regard, the collection system may request the endpoint device to go back to 3 intervals to get the consumption data in question. In response to the request, the endpoint device obtains the current consumption, a partial hour interval and the last three intervals (for 3 hours), and subtracts the amount consumed between the current time (12:05 PM Jun. 1, 2008) and the requested time (9 AM Jun. 1, 2008) from the total consumption. Based on the table above, the amount consumed between the current time and the requested time is "20" since 3 (partial)+12 (first interval)+3 (second interval)+2 (third interval) =20. The endpoint device returns the requested consumption data (123450−20=123430), the consumption data of 9:00 AM Jun. 1, 2008, to the collection system. It should be well understood that the above table and the aforementioned scenarios are provided as examples and should not be construed as limiting the claimed subject matter.

Figure 3:
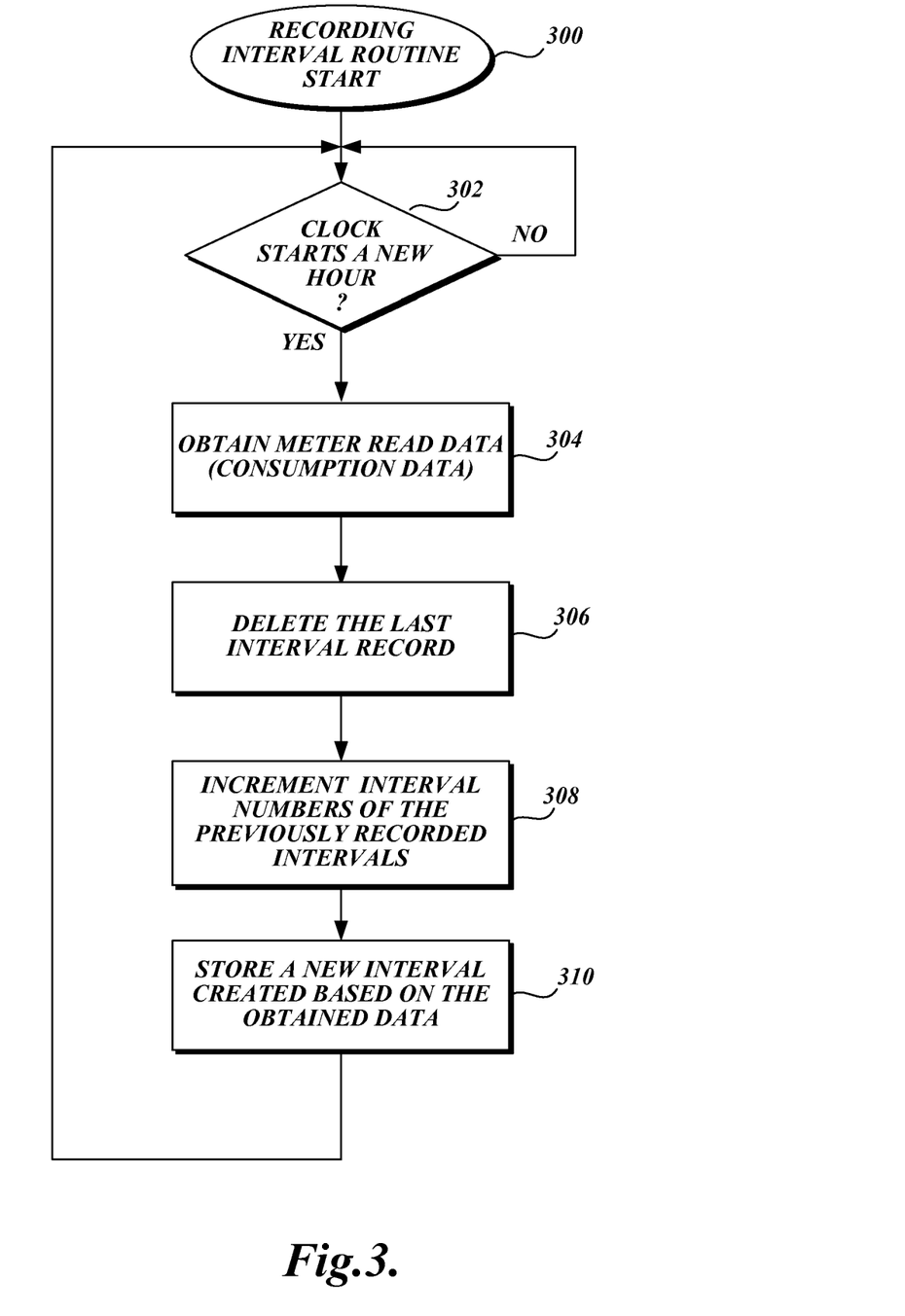
FIG. 3 is a flow diagram of one example routine for logging meter reading at each predetermined interval in accordance with an embodiment of the disclosed subject matter.

Now referring to FIG. 3, a flow diagram of a recording interval routine 300 for logging and managing meter reading data at hourly intervals is illustrated in accordance with one embodiment of the disclosed subject matter. The recording interval routine 300 begins with block 302 where a determination is made as to whether the clock of the endpoint device starts a new hour. As mentioned above, the clock of the endpoint device tracks minutes of an hour and, at the start of a new hour, triggers hourly interval recording of meter reading data. In this regard, at the start of each new hour, meter reading data is read from the meter for recording a new recorded interval. The new recorded interval is stored in the memory of the endpoint device. If it is determined that the new hour has not started at decision block 302, the routine returns to decision block 302.

If it is determined at decision block 302 that the clock starts a new hour (i.e., after each 60 minutes), a meter reading data is obtained from the associated utility meter for generating a new recorded interval for the previous hour as illustrated in block 304. For example, at 2:00 PM, the endpoint device generates a new recorded interval for 1:00 PM-2:00 PM. At block 306, the last recorded interval in the log is deleted from the memory to maintain a fixed number of recorded intervals at any time. As discussed above, the endpoint device maintains a predetermined number of recorded intervals, for example, 960 recorded intervals. Thus, before adding a new recorded interval, the last recorded interval is removed from the memory. At block 308, the order of the existing recorded intervals that were previously stored is updated so that the new recorded interval is stored as the first recorded interval. In one embodiment, each recorded interval has an associated interval number, as shown in the above-mentioned tables. In that embodiment, the interval numbers of the existing recorded intervals are incremented. An example of the recorded intervals and the interval numbers are shown in the table discussed above. At block 310, a new recorded interval (with interval #1) created for the meter reading data at the start of a new hour is stored in the memory of the endpoint device. The routine 300 returns to block 302 where the routine repeats the above-mentioned steps.

It should be well understood that recording interval routine 300 described above with reference to FIG. 3 does not show all of the steps and functions performed within the endpoint device or the meter reading system. Although the recording interval routine 300 generally describes the logging and managing process that is triggered hourly by the clock, the logging and managing process can be triggered at particular intervals set by the meter reading system. Those skilled in the art and others will recognize that some steps and/or exchanges of data described above may be performed in a different order, omitted/added, or otherwise varied without departing from the scope of the claimed subject matter.

In the aforementioned embodiments, measurement accuracy of one hour can be warranted even within un-calibrated systems (where the endpoint device time has never been synchronized to an external clock). Some embodiments require more accurate timestamps for logging since an accuracy of one hour may be unacceptable and/or undesirable in many meter reading systems. As discussed previously, the endpoint device has a clock which tracks minutes and triggers recording of meter reading data for a particular hour at the end of that hour (or the start of a new hour after passing that particular hour). In one embodiment, to conserve battery power, a low power clock, such as a slow crystal oscillator, may be utilized by the endpoint device, which can drift 15-20 seconds per day, or 10-15 minutes in a 40 day period. Due to the time drift and the recording of meter reading data at hourly intervals, if this clock is not synchronized (not calibrated) to an external clock, the point where the endpoint device records data can be up to one hour off (an accuracy of one hour) in a worst case scenario. Such error can be eliminated by adjusting the time of the clock of the endpoint device to the collection system time and by recording an extra interval of meter reading data. After the endpoint device adjusts its clock to match the collection system time, the end of the hour of the clock actually corresponds to the end of the hour of the collection system time. The consumption data is calculated after the time has been adjusted.

However, in some embodiments, it is desired to reduce consumption calculation errors regardless of performing the time synchronization between the endpoint and collection systems. In some embodiments, consumption calculation errors caused by time drift in an endpoint device can be substantially eliminated by adjusting a requested time. A representative embodiment of a process for adjusting the requested time to calculate consumption data in response to a request from a collection system is described in detail below in connection with FIG. 4.

By way of example, consider a scenario where the endpoint device time measured by the clock 210 is at 58 minutes when a collection system sends a request for consumption data. An exemplary table showing recorded intervals stored in the endpoint device at one point of time is as follows:

TABLE 2

| Consumption | 12677 | 3:58 PM Jul. 01, 2008 |
|---|---|---|
| Partial hour | 3 | 3:00 PM-3:58 PM Jul. 01, 2008 |
| Interval # | Value | |
| 1 | 14 | 2:00 PM-3:00 PM Jul. 01, 2008 |
| 2 | 3 | 1:00 PM-2:00 PM Jul. 01, 2008 |
| 3 | 2 | 12:00 PM-1:00 PM Jul. 01, 2008 |
| 4 | 5 | 11:00 AM-12:00 PM Jul. 01, 2008 |
| . | . | |
| . | . | |
| . | . | |
| 960 | 2 | 2:00 PM-3:00 PM May 22, 2008 |

For ease of discussion, assume that the clocks of the endpoint device and the collection system have a one minute time difference or error when the request was received by the endpoint device. For example, the endpoint device time is at 58 minutes, and the collection system time is at 3:59 PM. Assume that the collection system requires consumption data that have been collected from 12:00 noon to the current time. In one embodiment, the collection system sends a requested time indicating that the endpoint device is requested to obtain consumption data that have been collected since the $3^{rd}$ interval hour (as shown above in the table, $3^{rd}$ interval is 12:00 PM-1:00 PM). As mentioned previously, in the request message, the request time may be represented by a number of hours, a specific time period, a start time interval and end time interval, or the like.

Upon receipt of the request, the endpoint device reads the recorded intervals in accordance with the request. In this case, the endpoint device reads the first, second, and third recorded interval to calculate the consumption data from 12:00 PM Jul. 1, 2008. As shown in Table 2 described above, the calculated consumption data is 12 ($1^{st}$ interval)+1 (second interval)+2 (third interval)+3 (partial hour)=18. The endpoint device may return the calculated consumption data to the collection system.

Referring back to the scenario discussed above, assume that, this time, the same collection system requires consumption data from the same endpoint device one minute later. In such a case, the endpoint device time is at 59 minutes, and the collection system time is at 4:00 PM. The clocks of the endpoint device and the collection system still have a one minute error. The recorded intervals stored in the endpoint device are depicted in an exemplary table as follows:

TABLE 3

| Consumption | 12678 | 3:59 PM Jul. 01, 2008 |
|---|---|---|
| Partial hour | 4 | 3:00 PM-3:59 PM Jul. 01, 2008 |
| Interval # | Value | |
| 1 | 14 | 2:00 PM-3:00 PM Jul. 01, 2008 |
| 2 | 3 | 1:00 PM-2:00 PM Jul. 01, 2008 |

TABLE 3-continued

| | | |
|---|---|---|
| 3 | 2 | 12:00 PM-1:00 PM Jul. 01, 2008 |
| 4 | 5 | 11:00 AM-12:00 PM Jul. 01, 2008 |
| . | . | |
| . | . | |
| . | . | |
| 960 | 2 | 2:00 PM-3:00 PM May 22, 2008 |

Assume further that the collection system requests the endpoint device to go back 4 interval hours (i.e., the request is sent to indicate that $1^{st}$ interval hour is 3:00 PM-4:00 PM; 2 interval hour is 2:00 PM-3:00 PM; $3^{rd}$ interval hour is 1:00 PM-2:00 PM; and $4^{th}$ interval hour is 12:00 PM-1:00 PM) in order to get the consumption data from 12:00 PM to the current time. Upon receipt of the request, the endpoint device goes back 4 interval hours to get the requested consumption data. However, since the current endpoint device time is at 59 minutes, the endpoint device has not yet created a recorded interval for "3:00 PM-4:00 PM Jul. 1, 2008". As shown in Table 3, the first recorded interval contains the meter reading data for "2:00 PM-3:00 PM Jul. 1, 2008." Thus, the endpoint device goes back 4 interval hours from the current time of the endpoint device ($1^{st}$ interval hour is 3:00 PM-2:00 PM, $2^{nd}$ interval hours is 2:00 PM-1:00 PM, $3^{rd}$ interval hours is 1:00 PM-12:00 PM and $4^{th}$ interval hours is 12:00 PM-1:00 PM) and reads the first four recorded intervals, which is in fact the 11 AM reading. As a result, the consumption data is incorrectly calculated. As such, although there is only one minute error, there is one hour uncertainty in the consumption data.

Conventionally, in order to get the correct consumption data in those cases, the collection system may have to 1) look at the return data and the endpoint device time; 2) adjust the requested time; 3) re-request the data using the adjusted requested time. However, this approach makes logic of the collection system much more complex, as the collection system needs to evaluate the returned data on the fly to see if the data is correct. This would be a major hindrance and cause excessive complexity in implementing a collection system.

Those problems can be solved by having the endpoint device adjust the requested time if the time drift in the endpoint device exceeds a threshold, as will be briefly described here. In some embodiments, the endpoint device may evaluate whether the time difference between the collection system time and the endpoint device time is more than a threshold (e.g., 30 minutes). If the difference is as great as the threshold, the endpoint changes the requested time (e.g., a number of hours, a number of intervals, etc.) by +/−1 hour or interval, to guarantee that the data returned is the closest recorded interval(s) desired by the collection system. Such adjustment eliminates the need to re-request data in a time synchronized system, and guarantees the data returned in a non-time synchronized system is within ½ hour accuracy.

Figure 4:
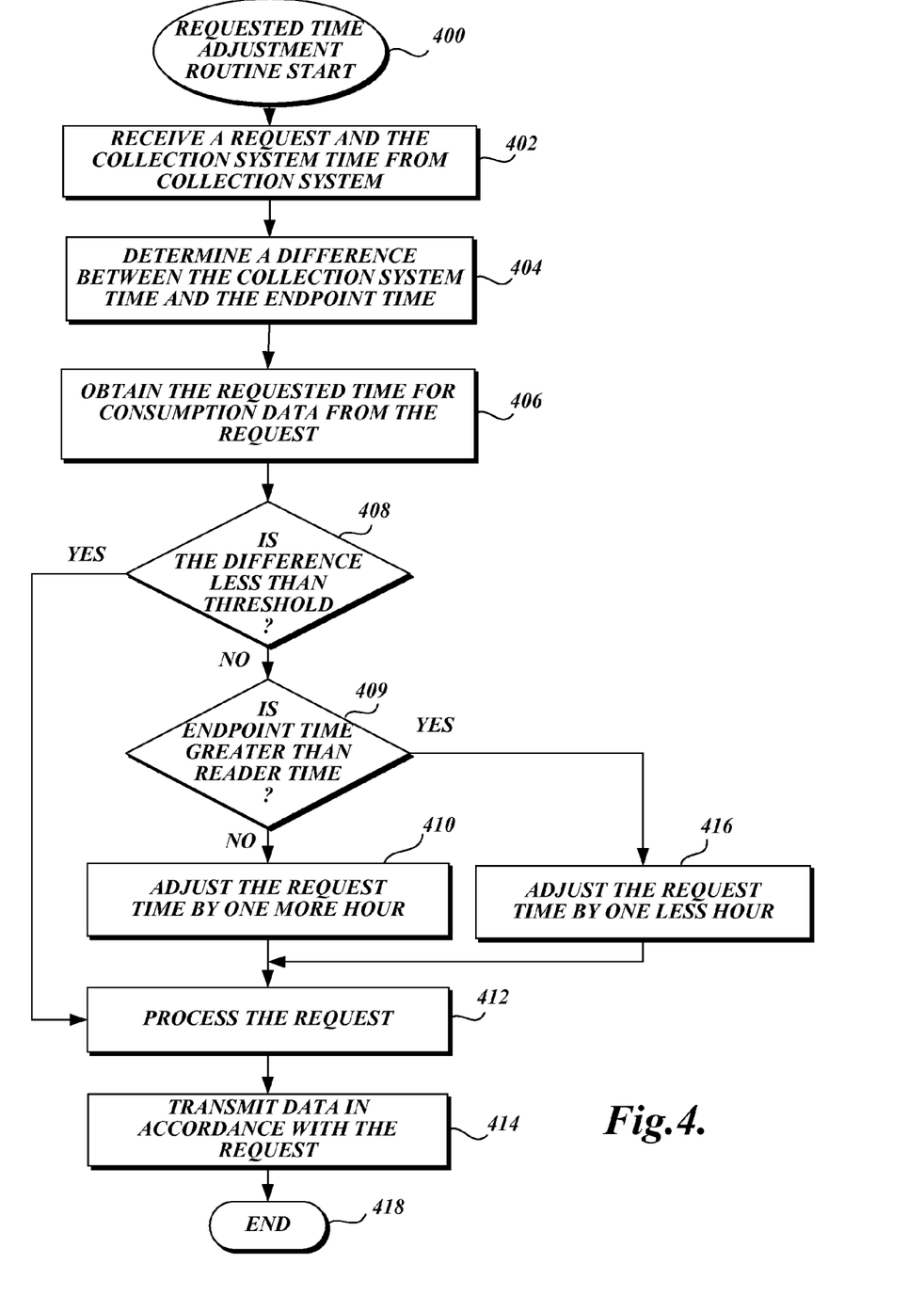
FIG. 4 is a flow diagram of one example routine for adjusting the number of intervals in a request for meter reading data.

Referring to FIG. 4, a flow diagram of a requested time adjustment routine 400 for adjusting a requested time in order to read the most appropriate/accurate set of recorded intervals is illustrated.

The routine 400 begins with block 402 where a request for consumption data, the collection system time, the requested time/intervals, and other data are received from the collection system. At block 404, a difference between the collection system time and the endpoint device time is determined. The requested time adjustment routine proceeds to block 406 where the requested time is obtained. In one embodiment, the collection system sends the requested time along with the request (request message) for obtaining consumption data from the endpoint device. In that case, the requested time is extracted from the request.

Next, at decision block 408, a determination is made as to whether the difference between the collection system time and the endpoint device time is less than a threshold, for example 30 minutes. If the difference is not less than the threshold, the requested time is adjusted by +/−1 hour or interval. In this regard, if the collection system time is less than the endpoint device time and the difference is as great as the threshold (e.g. 30 minutes), it is assumed that the endpoint device time is faster than the collection system time. In such a case, the requested time needs to be adjusted by one less hour. Likewise, if the endpoint device time is less than the collection system time and the difference is as great as the threshold, it is assumed that the collection system time is faster than the endpoint device time. In such case, the requested time is adjusted by one more hour.

If it is determined at decision block 408 that the difference is not less than the threshold, the routine proceeds to another decision block 409 where a determination is made as to whether the endpoint device time is greater than the collection system time. If it is determined at decision block 409 that the endpoint device time is greater than the collection system time, at block 416 the requested time is adjusted by one less hour. For example, if the collection system requests the previous 4 hours of consumption data, after adjusting the requested time the endpoint device obtains the previous 3 hours of consumption data instead. In one embodiment, if the collection system has requested a first hour recorded interval and the difference is less than the threshold, the requested time is not adjusted since an invalid interval result may be returned.

If it is determined at decision block 409 that the endpoint device time is less than the collection system time, at block 410 the requested time is adjusted by one more hour. For example, if the collection system requests the previous 4 hours of consumption data, after adjusting the requested time the endpoint device obtains the previous 5 hours of consumption data instead. As will be understood by one of skill in the art, the hourly time adjustment is described as an example and the requested time can be represented and adjusted by any type/length of predefined time interval.

If it is determined at decision block 408 that the difference is less than the threshold, or after finishing blocks 410 and 416, the endpoint device processes the request received from the collection system as illustrated at block 412. Once block 412 is reached, based on the adjusted requested time, the appropriate set of recorded intervals of consumption data has been identified. Accordingly, the endpoint device is able to retrieve the appropriate data from memory to calculate the consumption of the utility service as described above. Once the request has been processed, the calculated consumption data are transmitted to the collection system, at block 414. The routine 400 then terminates at block 418.

It should be well understood that the routine 400 described above with reference to FIG. 4 does not show all of the functions and steps performed within the collection system or endpoint devices. Instead, the routine 400 generally describes the processes performed to properly calculate consumption data on an endpoint device. Accordingly, those skilled in the art and others will recognize that some functions/steps and/or exchange of data described above may be performed in a different order, omitted/added, or otherwise varied without departing from the scope of the claimed subject matter.

In one embodiment, the endpoint device may be configured to synchronize its time with the time of the collection system obtained in the received request. In other embodiments, the timing clock of the endpoint device is synchronized by the collection system at a predetermined interval, for example, at every 24 hours, or the like. In either instance, the requested time adjustment process routine 400 described above with reference to FIG. 4 allows the endpoint device to guarantee that the calculated consumption data returned includes the closest interval requested by the collection system. In a worst-case scenario involving a non-time synchronized meter reading system, the disclosed subject matter guarantees that consumption data will be accurate to within 30 minutes. In instances when the disclosed subject matter is implemented in conjunction with time synchronization of the endpoint device, additional precision, accurate to within a few minutes, is achieved.

In one aspect, regardless of the time adjustment (time synchronization) made to the endpoint device, the endpoint device is able to determine the most accurate set of intervals as long as the endpoint device knows the collection system time and adjusts the requested time accordingly. Thus, the process for adjusting the requested time can be implemented independently from time synchronization between the endpoint and collection systems. Further, the process for adjusting the requested time does not result in updating the meter reading data that have been already logged and stored in the endpoint device. It is further noted that the requested time can be represented in any type or form as long as the endpoint device can interpret the requested time to determine an accurate set of recorded intervals.

In some alternative embodiments, when a request for consumption data is received by the endpoint device, a check is performed to see if the collection system time is included. If the collection system time is not included, the response for the specific hour requested is returned. If the collection system time is included, the endpoint device implements the process for adjusting the requested time in accordance with the described embodiments and examples.

While embodiments of the claimed subject matter have been illustrated and described, it will be appreciated that various changes can be made therein without departing from the spirit and scope of the claimed subject matter.

The embodiments of the invention in which an exclusive property or privilege is claimed are defined as follows:

1. A method of providing accurate meter reading data from an endpoint device, the method comprising:
   receiving, from a remote device, a current remote device time and a request for meter reading data for a specified number of time intervals;
   determining whether a difference between the remote device time and the endpoint device time is less than a threshold;
   if the difference is not less than the threshold:
     adjusting the number of time intervals used to calculate meter reading;
     calculating the meter reading data over the adjusted number of time intervals; and
     responding to the request by transmitting the calculated meter reading data over the adjusted number of time intervals to the remote device.

2. The method as recited in claim 1, wherein adjusting the number of time intervals includes:
   if the current remote device time is greater than the endpoint device time, adjusting the number of time intervals used to calculate meter reading to include one more time interval than is reflected in the request; and
   if the endpoint device time is greater than the current remote device time, adjusting the number of time intervals used to calculate meter reading to include one less time interval than is reflected in the request.

3. The method as recited in claim 1, further comprising if the difference is less than the threshold:
   calculating the meter reading data over the number of time intervals specified in the request; and
   responding to the request by transmitting the calculated meter reading data for the specified number of time intervals to the remote device.

4. The method as recited in claim 1, wherein the meter reading data is transmitted to the remote device without causing the endpoint device to record a short interval of consumption data.

5. The method as recited in claim 1, wherein the calculated meter reading data is transmitted to the remote device without adjusting the number of intervals if the current remote device time is not received from the collection system.

6. The method as recited in claim 1, wherein calculating the meter reading data over the adjusted number of time intervals is performed without adjusting the time that is maintained by the endpoint device.

7. The method as recited in claim 1, wherein calculating the meter reading data over the adjusted number of time intervals is performed without adjusting the time that is maintained by the remote device.

8. The method as recited in claim 1, wherein the threshold for adjusting the number of time intervals is 30 minutes.

9. An apparatus for transferring accurate meter reading data from an associated endpoint device to a collection system, the apparatus comprising:
   a memory unit for storing meter reading data collected at predetermined time intervals;
   a communication unit for receiving, from the collection system, a collection system time and a request for meter reading data for a specified number of time intervals; and
   a processing unit operable to:
     determine whether a difference between the collection system time and the endpoint device time is less than a threshold; and
   if the difference is not less than the threshold:
     adjust the number of time intervals used to calculate meter reading;
     calculate the meter reading data over the adjusted number of time intervals; and
     respond to the request by causing the communication unit to transmit the calculated meter reading data over the adjusted number of time intervals to the collection system.

10. The apparatus of claim 9, wherein the number of time intervals used to calculate the meter reading data is adjusted to include one less time interval than is reflected in the request if the time of the endpoint device is greater than the time as reported by the collection system.

11. The apparatus of claim 9, wherein the number of time intervals used to calculate the meter reading data is adjusted to include one more time interval than is reflected in the request if the time as reported by the collection system is greater than the time of the endpoint device.

12. The apparatus of claim 10, wherein a recorded interval is generated to include the meter reading data collected at a predetermined time interval and the time interval information and the generated record interval are stored in the memory.

13. The apparatus of claim 9, wherein the minute portion of the current collection system time is extracted to determine the difference between the current collection system time and the endpoint device time.

14. The apparatus of claim 10, wherein the threshold for adjusting the time intervals is 30 minutes.

* * * * *